United States Patent
Das et al.

(10) Patent No.: US 8,060,454 B2
(45) Date of Patent: Nov. 15, 2011

(54) METHOD AND APPARATUS FOR IMPROVED REWARD-BASED LEARNING USING NONLINEAR DIMENSIONALITY REDUCTION

(75) Inventors: Rajarshi Das, Armonk, NY (US); Gerald J. Tesauro, Croton-on-Hudson, NY (US); Kilian Q. Weinberger, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/870,698

(22) Filed: Oct. 11, 2007

(65) Prior Publication Data
US 2009/0098515 A1    Apr. 16, 2009

(51) Int. Cl.
   *G06F 15/18* (2006.01)
(52) U.S. Cl. ......................................................... 706/12
(58) Field of Classification Search ...................... 706/16
   See application file for complete search history.

(56) References Cited

U.S. PATENT DOCUMENTS
2007/0203862 A1 * 8/2007 Sekiai et al. .................... 706/16

OTHER PUBLICATIONS

Belkin, Mkihail and Partha Niyogi. "Laplacian Eigenmaps for Dimensionality Reduction and Data Representation" [Online] Downloaded Oct. 21, 2010. Neural Computation 15, 1373-1396 2003.*
Bengio, Yoshua, Jean Francois Paiment, and Pascal Vincent "OutofSample Extensions for LLE, Isomap, MDS, Eigenmaps, and Spectral Clustering" [Online] Downloaded Oct. 26, 2010. Jul. 25, 2003.*
Si, Jennie and Yu-Tsung Wang, "Neuro-Dynamic Programming Based on Self-Organized Patterns", Proceedings of the 1999 IEEE International Symposium on Intelligent Control/Intelligent Systems and Seniotics, 1999, [Online] Downloaded Apr. 20, 2011, http://ieeexplore.ieee.org/stamp/stamp.jsp?tp=&arnumber=796641.

* cited by examiner

*Primary Examiner* — Kakali Chaki
*Assistant Examiner* — Ben Rifkin

(57) ABSTRACT

The present invention is a method and an apparatus for reward-based learning of management policies. In one embodiment, a method for reward-based learning includes receiving a set of one or more exemplars, where at least two of the exemplars comprise a (state, action) pair for a system, and at least one of the exemplars includes an immediate reward responsive to a (state, action) pair. A distance measure between pairs of exemplars is used to compute a Non-Linear Dimensionality Reduction (NLDR) mapping of (state, action) pairs into a lower-dimensional representation, thereby producing embedded exemplars, wherein one or more parameters of the NLDR are tuned to minimize a cross-validation Bellman error on a holdout set taken from the set of one or more exemplars. The mapping is then applied to the set of exemplars, and reward-based learning is applied to the embedded exemplars to obtain a learned management policy.

24 Claims, 4 Drawing Sheets

METHOD AND APPARATUS FOR IMPROVED REWARD-BASED LEARNING USING NONLINEAR DIMENSIONALITY REDUCTION

BACKGROUND

The present invention relates generally to the management or control of systems or plants, and relates more particularly to the autonomic development of management policies using reward-based learning.

In many application domains, such as distributed computing systems, the development of management policies typically entails the development of explicit models of system behavior (e.g., based on queuing theory or control theory) and interactions with external components or processes (e.g., users submitting jobs to the system). A common problem with such an approach is that devising the necessary models is often a knowledge- and labor-intensive, as well as time consuming, task. Hence, there is a great need for adaptive machine learning methods (e.g., reward-based learning methods) to automatically develop effective management policies, thereby avoiding extensive and time-consuming engineering of explicit domain knowledge.

However, a frequent and common limitation of such machine learning methods is that learning becomes progressively more difficult as the complexity of the managed system increases. For example, the complexity of learning may commonly increase exponentially with the total number of input dimensions (i.e., the number of input variables plus the number of control variables; this is sometimes referred to as the "Curse of Dimensionality").

Thus, there is a need for an improved method for reward-based learning that addresses the curse of dimensionality which limits existing methods.

SUMMARY OF THE INVENTION

The present invention is a method and an apparatus for reward-based learning of management policies. In one embodiment, a method for reward-based learning includes receiving a set of one or more exemplars, where at least two of the exemplars comprise a (state, action) pair for a system, and at least one of the exemplars includes an immediate reward responsive to a (state, action) pair. A distance measure between pairs of exemplars is used to compute a Non-Linear Dimensionality Reduction (NLDR) mapping of (state, action) pairs into a lower-dimensional representation, thereby producing embedded exemplars, wherein one or more parameters of the NLDR are tuned to minimize a cross-validation Bellman error on a holdout set taken from the set of one or more exemplars. The mapping is then applied to the set of exemplars, and reward-based learning is applied to the embedded exemplars to obtain a learned management policy.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for reward-based learning of management or control policies, utilizing innovative methods for dimensionality reduction of data.

In some embodiments, techniques for non-linear dimensionality reduction using a given distance metric Do are applied to obtain a reduction mapping E( ), which maps (state, action) pairs into a lower-dimension representation. One can then apply any one or more of a number of known reward-based learning methods to a lower-dimension data set obtained using the reduction mapping E( ) in order to obtain a management policy.

Embodiments of the present invention employ reward-based learning methodologies, including well-known Reinforcement Learning (RL) techniques, in order to generate effective policies (i.e., deterministic or non-deterministic behavioral rules or mappings of system states to management actions) for management of a system. Within the context of the present invention, the term "reward-based learning" refers to machine learning methods that directly or indirectly learn policies based on one or more temporally related observations of an environment's current state, an action taken in the state, and an immediate "reward" (e.g., a scalar measure of value) obtained as a consequence of performing the given action in the given state. Further, within the context of the present invention, "Reinforcement Learning" refers to a general set of trial-and-error reward-based learning methods whereby an agent can learn to make good decisions in an environment through a sequence of interactions. Known Reinforcement Learning methods that may be implemented in accordance with the present invention include value-function learning methods (such as Temporal Difference Learning, Q-Learning or Sarsa), actor-critic methods and direct policy methods (e.g., policy gradient methods).

Figure 1:
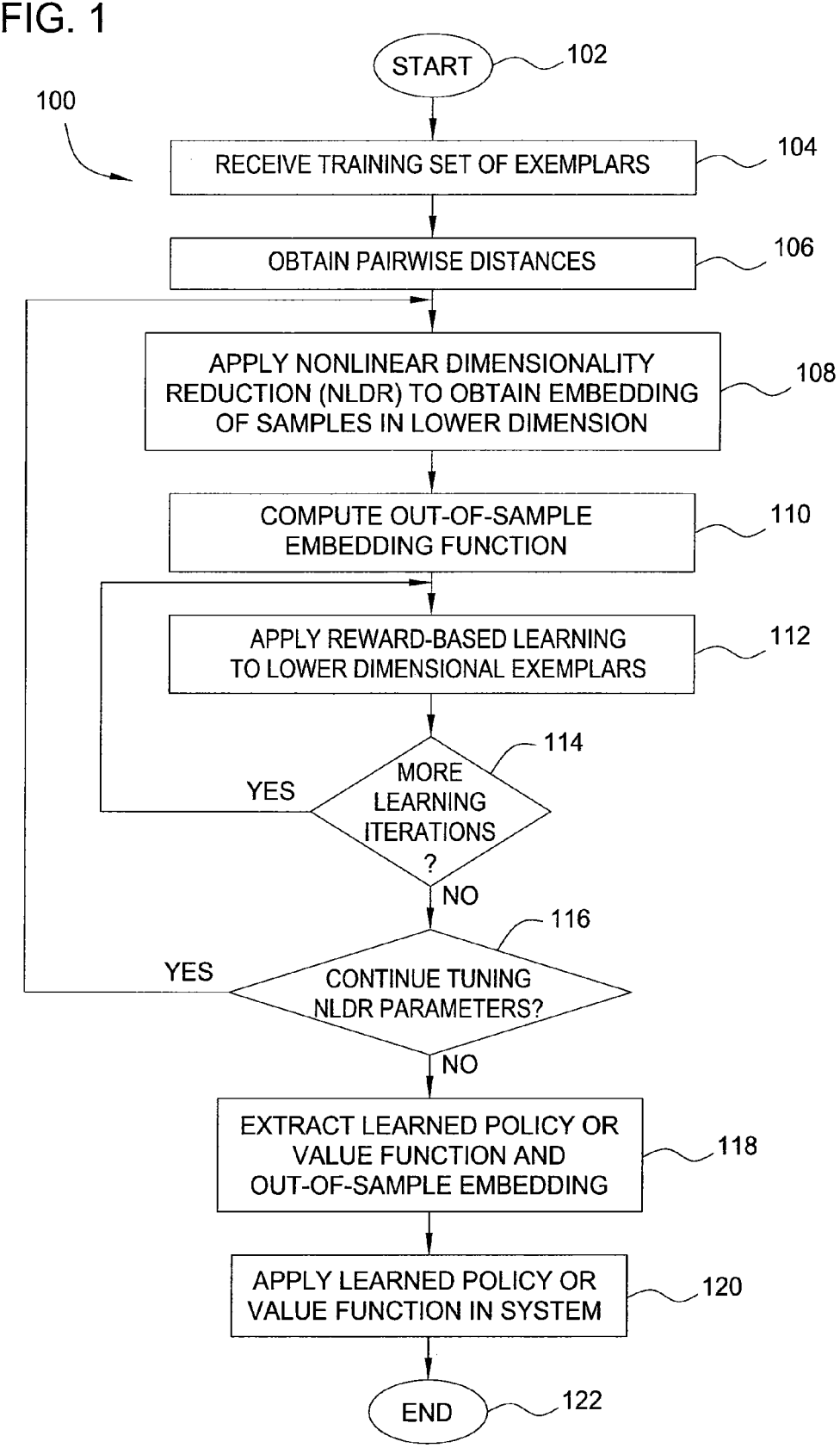
FIG. 1 is a flow diagram illustrating one embodiment of a method for reward-based learning, according to the present invention.

FIG. 1 is a flow diagram illustrating one embodiment of a method 100 for reward-based learning, according to the present invention. Specifically, given a training set comprising a plurality of fully or partially observed (state, action, reward, new state) tuples, the method 100 obtains a general embedding function, E, that is capable of mapping an arbitrary (state, action) pair into a point, z, in a lower dimensionality space. The dimensionality of z is less than the sum of the dimensionality of s plus the dimensionality of a. The method 100 thus may be implemented, for example, to automatically learn a policy for managing or controlling a system or plant.

The method 100 is initialized at step 102 and proceeds to step 104, where the method 100 receives a training set of S exemplars. Each exemplar typically comprises a fully or partially observed tuple of (state, action, reward, new state) information, herein denoted as (s, a, r, s'). In the tuple, s comprises measurable and quantifiable attributes pertaining to a description of the current state of the system or plant; a comprises measurable and quantifiable attributes of the control variables used to manage the system or plant; r comprises an immediate reward responsive to action a in state s; and s' comprises a description of a new state to which the system transitions after performing action a in state s.

In step 106, the method 100 obtains a set of pairwise distances $\{d_{ij}\}$, where $d_{ij}$ denotes a measure of distance between a first exemplar i and a second exemplar j. In one embodiment, the set of pairwise distances is provided (i.e., pre-specified) along with the training set of exemplars. In another embodiment, a general distance metric, D((s, a), (s', a')) (hereinafter generally referred to as "D( )"), is provided, and the set of pairwise distances $\{d_{ij}\}$ may be computed by applying D( ) to a set of exemplar pairs. In another embodiment of step 106, the method 100 computes the set of pairwise distances in accordance with a learned distance metric. The distance metric may be learned, for example, using the methods discussed in U.S. patent application Ser. No. 11/870,661, filed Oct. 11, 2007, which is herein incorporated by reference in its entirety.

In one embodiment, the distance metric D( ) comprises a general distance metric over joint state-action pairs (i.e., the distance metric D( ) comprises a general distance metric in an $(N_s+N_a)$-dimensional metric space, where $N_s$ is the dimensionality of states, and $N_a$ is the dimensionality of actions). In another embodiment, the distance metric D( ) comprises a pair of distance metrics $(D_s( ), D_a( ))$ where $D_s( )$ is a distance metric pertaining to pairs of states and $D_a( )$ is a distance metric pertaining to pairs of actions. In another embodiment, the distance metric D( ) expresses a sum of $(D_s( )+D_a( ))$, while in other embodiments, the distance metric D( ) is given simply by $D( )=D_s( )$ or by $D( )=D_a( )$.

In one embodiment, the distance metric D( ) is the general L–p norm, in which the distance between two exemplar vectors $x_i$ and $x_j$ of length d is given by $(\Sigma^d_{k=1}(x_{ik}-x_{jk})^p)^{1/p}$, where p is a non-negative norm exponent and the summation over k denotes summing over the components of the d-dimensional vectors $x_i$ and $x_j$. In one embodiment, the elements of $x_i$ and $x_j$ comprise "raw" (i.e., un-normalized) observation values. In another embodiment, the elements of $x_i$ and $x_j$ are normalized (or standardized) by dividing by their standard deviation or range before applying the distance metric D( ). In other embodiments, particular metrics corresponding to particular values of p are used. For example, the popular Euclidean metric may be used by setting p=2; the Manhattan (a.k.a. City Block) metric may be used by setting p=1; and the $L_\infty$ norm metric may be used by setting p=∞. Additionally, it is noted that the Hamming distance may be used by setting p=1, provided that the elements of $x_i$ and $x_j$ are binary.

In an alternative embodiment, the Mahalanobis distance $((x_i-x_j)M(x_i-x_j)^T)^{1/2}$ is used as the distance metric, where M is a positive semi-definite matrix and $(x_i-x_j)^T$ denotes the transpose of the difference vector $(x_i-x_j)$. In one such embodiment, M is the inverse of the data covariance matrix. In other such embodiments, M may relate to a linear transformation matrix according to $M=AA^T$, and the transformation matrix A may be learned by an adaptive distance metric method, such as the method described in U.S. patent application Ser. No. 11/870,661 as cited above.

Given the training set of exemplars and the set of pairwise distances, the method 100 proceeds to step 108 and applies nonlinear dimensionality reduction (NLDR) to the exemplars using the pairwise distances in order to obtain an embedding of the exemplars in a lower-dimensional space. In one embodiment, the embedding comprises a mapping of an exemplar state-action pair $(s_i, a_i)$ into a lower-dimensional vector $z_i$, where the dimensionality of $z_i$ is less than the dimensionality of $s_i$ plus the dimensionality of $a_i$. In one embodiment, NLDR is applied separately to states and to actions, so that the embedding $z_i$ of exemplar i comprises a pair $(\sigma_i, \mathcal{B}_i)$, where $\sigma_i$ comprises an embedding of state $s_i$, and $\mathcal{B}_i$ comprises an embedding of action $a_i$. In other embodiments, NLDR is applied only to states, or only to actions; in these embodiments, $z_i$ comprises a pair $(\sigma_i, a_i)$ or $(s_i, \mathcal{B}_i)$, accordingly.

In one embodiment, the applied nonlinear dimensionality reduction technique comprises one or more of the following algorithms: Laplacian Eigenmaps, Maximum Variance Unfolding, Isomap, Spatio-temporal Isomap, Local Linear Embedding, Stochastic Proximity Embedding, or Random Projections.

The method 100 then proceeds to step 110 and, from the embedding of exemplars, constructs an out-of-sample embedding function, E, capable of mapping an out-of-sample (i.e., not contained in the training set of exemplars) (state, action) pair (s, a) into a lower-dimensional vector z. In one embodiment, the embedding function E is constructed from the embedding of exemplars using Local Linear Embedding. Since this approach requires the identification of the subset of training exemplars that are closest to the out-of-sample exemplar in the original high-dimensional space, it is likely to be computationally efficient if the exemplars in the training set are indexed and stored in a way that allows for quick access to the nearest exemplars.

In an alternative embodiment, the embedding E of an out-of-sample (state, action) pair may be obtained by forming the union of the exemplars in the training set and the new (state, action) pair, and reapplying an NLDR technique to the union.

In a further alternative embodiment, a fast incremental NLDR technique, such as Stochastic Proximity Embedding, is used to incrementally incorporate a new (state, action) pair to the set of embedded exemplars.

In step 112, the method 100 applies a reward-based learning algorithm (e.g., a Reinforcement Learning algorithm) to the set of embedded exemplars. In one embodiment, the reward-based learning algorithm incrementally learns a value function, Q(z), where z denotes an embedding of a (state, action) pair (s, a), and Q(z) denotes the cumulative discounted or undiscounted long-range expected value when action a is taken in state s. The value function Q(z) induces a management or control policy by application of a value-maximization principle that stipulates selecting, among all admissible actions that could be taken in state s, the action with the greatest expected value. The value function Q(z) may be learned by a value function learning algorithm such as Temporal Distance Learning, Q-Learning or Sarsa. For example, in the Sarsa(0) algorithm, one applies to each observed state/action/reward tuple the following learning algorithm:

$$\Delta Q(z^t) = \alpha(t)[r^t + \gamma Q(z^{t+1}) - Q(z^t)] \quad \text{(EQN. 1)}$$

where $z^t$ is the initial embedded (state, action) pair at time t, $r^t$ is the immediate reward at time t for taking the action $a^t$ in the initial state $s^t$, $z^{t+1}$ is the next embedded (state, action) pair at time t+1, γ is a constant representing a "discount parameter" (having a value between zero and one that expresses the present value of an expected future reward) and α(t) is a "learning rate" parameter that decays to zero asymptotically to ensure convergence.

The reward-based learning applied in step 112 comprises one or more sweeps through the training set of exemplars. After each sweep, the method 100 proceeds to step 114 and determines whether training may be stopped, or whether additional learning iterations applying the reward-based learning algorithm to the training set of exemplars are necessary. In one embodiment, training is stopped if a measure of training error (e.g., Bellman error) has reached a sufficiently small value. In another embodiment, training is stopped if the measure of training error has converged to an asymptotic value, or if the measure of training error is decreasing at a sufficiently slow rate. In a further embodiment, training is stopped if an upper bound on the number of training iterations has been reached. In a further different embodiment, the stopping point for training is determined according to any of a number of known regularization methods, such as minimizing cross-validation Bellman error on a holdout set of exemplars.

If the method 100 concludes in step 114 that additional learning iterations are necessary, the method 100 returns to step 112 for another sweep of reward-based learning through the training set of exemplars.

Alternatively, if the method 100 concludes in step 114 that additional learning iterations are not necessary, the method 100 proceeds to step 116 and determines whether NLDR should be reapplied using a different algorithm or a different set of parameters tunings. An example of a tunable NLDR parameter is the output embedding dimensionality. The method 100 envisions a search over NLDR parameter tunings, and selection of a parameter tuning so as to optimize a reward-based learning criterion. In one embodiment, said criterion comprises minimizing cross-validation Bellman error on a holdout set of exemplars.

If the method 100 concludes in step 116 that additional searches over parameter tunings are necessary, the method 100 returns to step 108 to perform an additional round of NLDR, out-of-sample embedding, and reward-based learning using different NLDR parameter tunings, as described above.

Alternatively, if the method 100 concludes in step 116 that no further searches over parameter tunings are necessary, the method 100 proceeds to step 118 and extracts and delivers the learned value function, combined with the general out-of-sample embedding function, for use in making management/control decisions in a system or plant.

In step 120, the learned policy or value function is applied to the system or plant. In one embodiment, to compute a management decision in a general state s of the system, the out-of-sample embedding function is used to create a set $\{z_i\}$ of all embedded admissible state-action pairs in the current state, the learned value function is applied to each element of $\{z_i\}$ to obtain a corresponding set of expected values $\{Q_i\}$, and then the action i* with highest expected value is selected. The method 100 then terminates in step 122.

The method 100 thus takes a "raw" set of training data suitable for reward-based learning methods (such as, for example, Reinforcement Learning (RL)) and applies dimensionality reduction techniques in order to obtain a transformed, lower-dimension training set. One can then apply any one or more of a number of known reward-based learning methods to the lower-dimension training set in order to obtain a behavioral policy.

The method 100 may be implemented in many different applications. For example, the method 100 may be implemented in the field of systems management, where quantities that describe the state of a distributed computing system comprise, e.g., workload levels, queue lengths, response times and throughput measures, central processing unit and memory utilizations, etc.; quantities that describe management actions comprise, e.g., allocated resource levels, control parameter/configuration settings, etc.; and rewards may represent an expected value of an overall multi-criteria utility function that expresses how well the system is performing with respect to a set of system management objectives.

In other embodiments, the method 100 may be applied to develop feedback controllers for "plants" (i.e., certain physical processes or systems amenable to regulation by feedback control). Examples include applications such as thermal regulation, fluid flow/electric current control, manufacturing assembly line control, and chemical process control. In this type of application, the state variables comprise measurements of system quantities that are being regulated (e.g., temperature, vehicle speed and direction, fluid flow rates etc.), as well as other quantities relevant to the dynamic evolution of system state over time. Control actions comprise adjustments to elements of the systems (e.g., throttles, fan speeds, valve openings, assembly line machines that can be turned on/off, etc.) that affect future evolution of the state of the system. The reward may pertain to differences between one or more state variables and one or more corresponding target or reference values of said state variables, with small differences corresponding to high reward, and large differences corresponding to low reward.

In one embodiment, the managed system is a data center which is responsible for the allocation of computing resources (e.g., servers) amongst multiple application environment modules that obtain value by utilizing the resources to perform computation.

Figure 2:
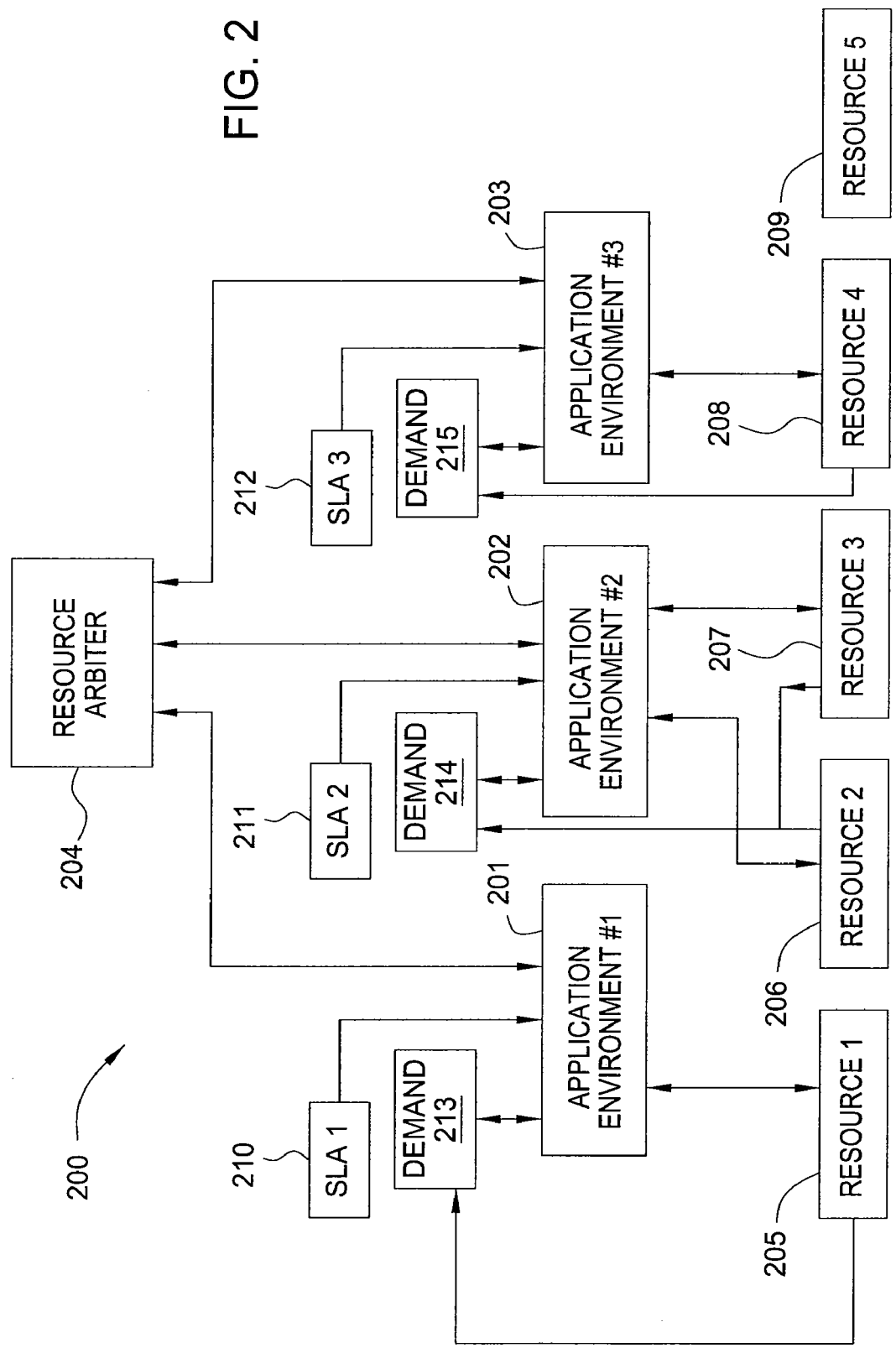
FIG. 2 illustrates one embodiment of a data center in which a resource arbiter module may make effective use of a management policy generated according to the method illustrated in FIG. 1.

FIG. 2 illustrates one embodiment of a data center 200 in which a resource arbiter module may make effective use of a management policy generated according to the method illustrated in FIG. 1. The data center 200 comprises a plurality of application environment modules 201, 202, and 203, one or more resource arbiters 204 and a plurality of resources 205, 206, 207, 208 and 209. Each application environment module 201-203 is responsible for handling respective demands 213, 214 and 215 (e.g., requests for information processing services) that may arrive from a particular customer or set of clients. Example client types include: online shopping services, online trading services, and online auction services.

In order to process client demands 213, 214 or 215, the application environments 201-203 may utilize the resources 205-209 within the data center 200. As each application environment 201-203 is independent from the others and provides different services, each application environment 201-203 has its own set of resources 205-209 at its disposal, the use of which must be optimized to maintain the appropriate quality of service (QoS) level for the application environment's clients. An arrow from an application environment 201-203 to a resource 205-209 denotes that the resource 205-209 is currently in use by the application environment 201-203 (e.g., in FIG. 2, resource 205 is currently in use by application environment 201). An application environment 201-203 also makes use of data or software objects, such as respective Service Level Agreements (SLAs) 210, 211 and 212 with its clients, in order determine how much business value is obtained by the application environment for various levels of computational system performance, and for a given level of demand for computing service. An example SLA 210-212 may specify payments to be made by the client based on mean end-to-end response time averaged over, say, a five-minute time interval. Additionally the client workload may be divided into a number of service classes (e.g., Gold, Silver and Bronze), and the SLA 210-212 may specify payments based on details of response time characteristics within each service class.

Each application environment 201-203 is in further communication with the resource arbiter module 204. The resource arbiter 204 is responsible for deciding, at any given time while the data center 200 is in operation, which resources 205-209 may be used by which application environments 201-203. In one embodiment, the application environments 201-203 and resource arbiter 204 are software modules consisting of autonomic elements (e.g., software components that couple conventional computing functionality with additional self-management capabilities), for example written in Java™, and communication between modules 201-203 and 204 takes place using standard Java interfaces. The modules 201-203 and 204 may run on a single computer or on different computers connected by a network such as the Internet or a Local Area Network (LAN). In the networked case, communication may additionally employ standard network communication protocols such as TCP/IP and HTTP, and standard Web interfaces such as OGSA.

Figure 3:
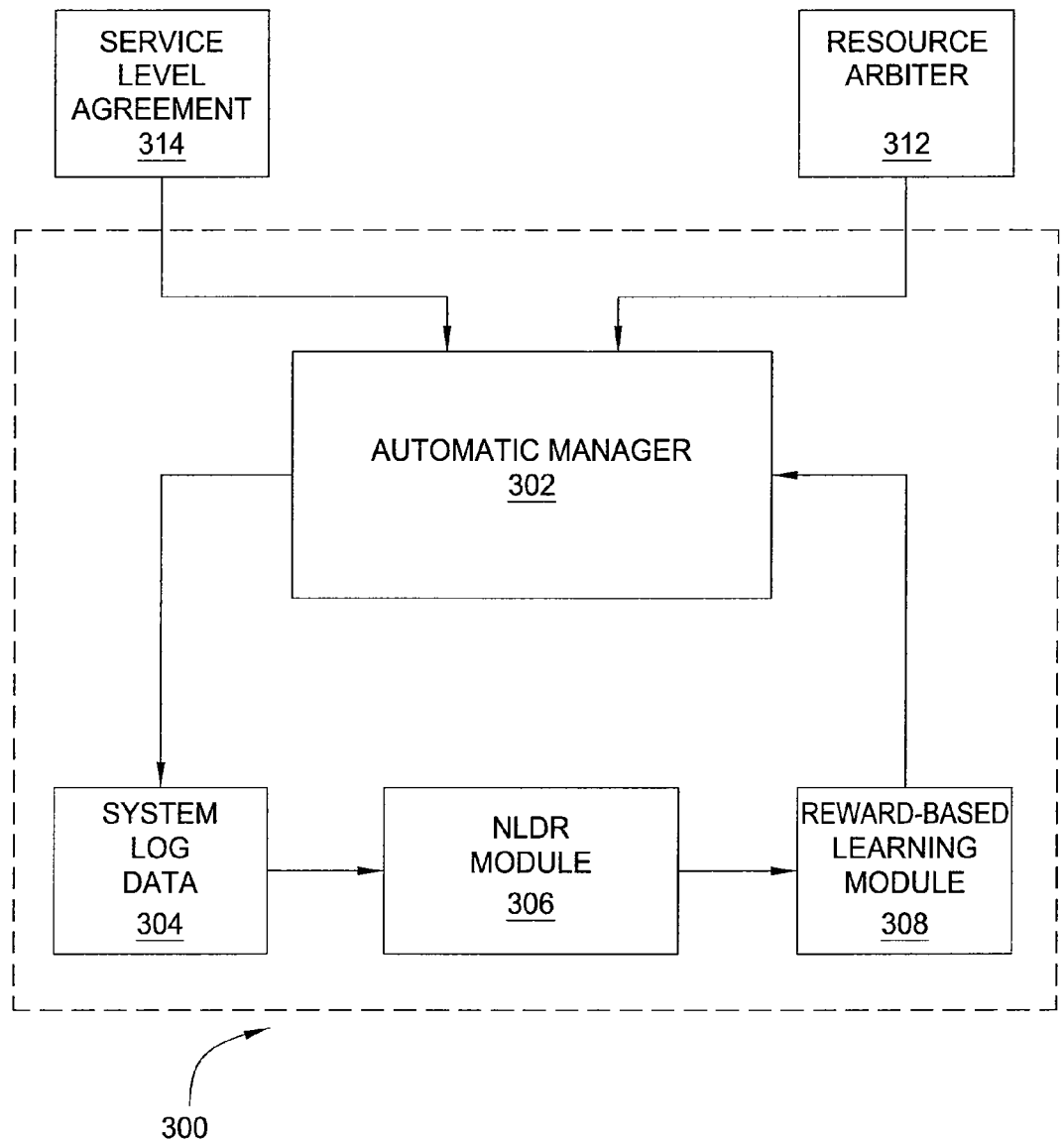
FIG. 3 illustrates how one embodiment of the invention may be used within a distributed computing system to automatically learn a management policy for allocating resources.

FIG. 3 illustrates how one embodiment of the invention may be used within a distributed computing system to automatically learn a management policy for allocating resources. Specifically, FIG. 3 illustrates the basic operations and functionality of one embodiment of an application environment module 300 according to the present invention, wherein the application environment module 300 is any of the application environments 201-203 depicted in FIG. 2. In one embodiment, the application environment 300 comprises at least an autonomic manager element 302, a system log data module 304, a nonlinear dimensionality reduction module 306, and a reward-based learning (e.g., Reinforcement Learning) module 308. It is noted that, with respect to the illustration of the inventive method 100 in FIG. 1, the nonlinear dimensionality reduction module 306 corresponds to steps 108 and 110, while the reward-based learning module 308 corresponds to steps 112 and 114. Interactions of the application environment 300 with its SLA 314, its client demand, its currently allocated resources, and with the resource arbiter element 312, are depicted as they were in FIG. 2.

Each application environment module 300 is responsible for handling respective demands (e.g., requests for information processing services) that may arrive from a particular customer or set of clients. In this embodiment, the state s of an application environment module may consist not only of the multitude of current aggregate performance metrics of the module, but also include a multitude of performance metrics derived from each of the servers currently allocated to the application environment. In this embodiment, where the application environment module handled web-based transactions, examples of performance metrics in each time interval may include the following: the number of new arrivals of requests, the number of requests waiting to be processed, the number of requests successfully served, the average response time, and the variance of the response time. Clearly, even for a small number of servers, the state s could be very high dimensional vector. The past history of state information s is recorded in the system log data module 304 and the nonlinear dimensionality reduction module 306 can be used to lower the dimensionality of the state information s before feeding the transformed data to the reward-based learning module 308.

The set or amount of resource allocation determines the nature of the action space. Since all the servers are identical in this embodiment, the action space is one dimensional, and each possible action simply indicates the number of servers that are to be allocated to an application environment module by the resource arbiter of the data center. Thus, in this embodiment, there is no need to apply nonlinear dimension reduction to the actions.

Each application environment module is also associated with a Service Level Agreement which indicates how much business value is obtained by the application environment for various levels of computational system performance, and for a given level of demand for computing service. In one embodiment, the SLA specifies payments to be made by the client based on mean end-to-end response time averages over the resource allocation time interval. Additionally, the client workload provided to the application environment 300 may be divided into a number of service classes (e.g., Gold, Silver and Bronze), and the SLA may specify a total payment, summed over the service classes, based on details of response time characteristics within each service class.

Each application environment module is also responsible for communicating to the resource arbiter of the data center a reward value r to indicate how much business value is obtained for a given actual or hypothetical set or amount of resources allocated to the application environment.

Given the above characterizations of the state, action and reward information for each application environment 300, the following discussion details the steps involved in one embodiment of method 100 for allocating resources between multiple application environments in a data center environment 200.

In this embodiment, the method 100 is in step 102 and proceeds to step 104, when a training set of exemplars of (s, a, r) tuples is first collected from an application environment module 300 in the system log data module 304, by either following a random resource allocation policy or by following a randomized version of an existing queuing-based or heuristic policy.

After standardizing and normalizing each of the attribute values in the state exemplars, the Euclidean distance metric is used to determine distances between all pairs of states s is obtained in step 106.

The application environment module 300 then proceeds to the NLDR module 306 (corresponding to step 108 in FIG. 1), where nonlinear dimension reduction is applied on the standardized and normalized set of training exemplars to reduce the dimension of the state space. In this embodiment, Isomap is used as the nonlinear dimension reduction technique. Approaches such as Isomap allow a user to specify the output dimension, and in the absence of a particular preference for the output dimensionality, results from Isomap for a set of different values of the output dimension is saved for separate RL training subsequently.

In this embodiment, the out-of-sample embedding function is obtained by reapplying Isomap with the new state vector in step 110. For computational efficiency, the distances between all pairs of exemplars in the training set is computed only once and stored in memory. Also, to avoid increasing the size of the training set and to track the behavior of the application environment over time, the oldest exemplars are dropped from the training set and are replaced by the new exemplars.

The application environment 300 then proceeds to the reward-based learning module 308 (corresponding to step 112 in FIG. 1), where the Sarsa(0) algorithm is applied to each transformed state/action/reward tuple in the training set.

The reinforcement learning process continues until step 114, when the method 100 determines that further training is not necessary. In this embodiment, this decision is made when the total number of training iterations exceeds a predetermined threshold or when the training error is below a predetermined threshold.

If the method 100 determines in step 116 that no further searches over parameter tunings of the Isomap are necessary, the method 100 then proceeds to step 118. In this embodiment, this decision is made when minimal training error is found among different sets of training exemplars, where each training set of exemplars was obtained from a particular setting of the output dimension in the Isomap algorithm.

In step 118, the learned value function and the general out-of-sample embedding function are extracted for use by the autonomic manager 302 in each application environment module 300 to communicate with the resource arbiter 312. To compute the values for obtaining a range of hypothetical server allocations, each application environment module 300 employs the out-of-sample embedding function to create a set $\{z_i\}$ of all embedded admissible state-action pairs in the current state, and the learned value function is applied to each element of $\{z_i\}$ to obtain a corresponding set of expected values $\{Q_i\}$.

In step 120, each application environment module 300 sends the set of expected values for different levels of hypothetical server allocations to the resource arbiter 312. The resource arbiter 312 combines this information from all of the application environment modules 300, determines the server allocation for all the application environment modules that maximizes value across the entire data center (either via enumerating or optimizing over all possible combinations of server allocations to the application environments), and allocates the servers to the application environments.

As each application environment evolves over time, new training exemplars are obtained from the system log data module 304 and the steps 102-118 are repeated to obtain and apply new learned policy and out-of-sample embedding.

Figure 4:
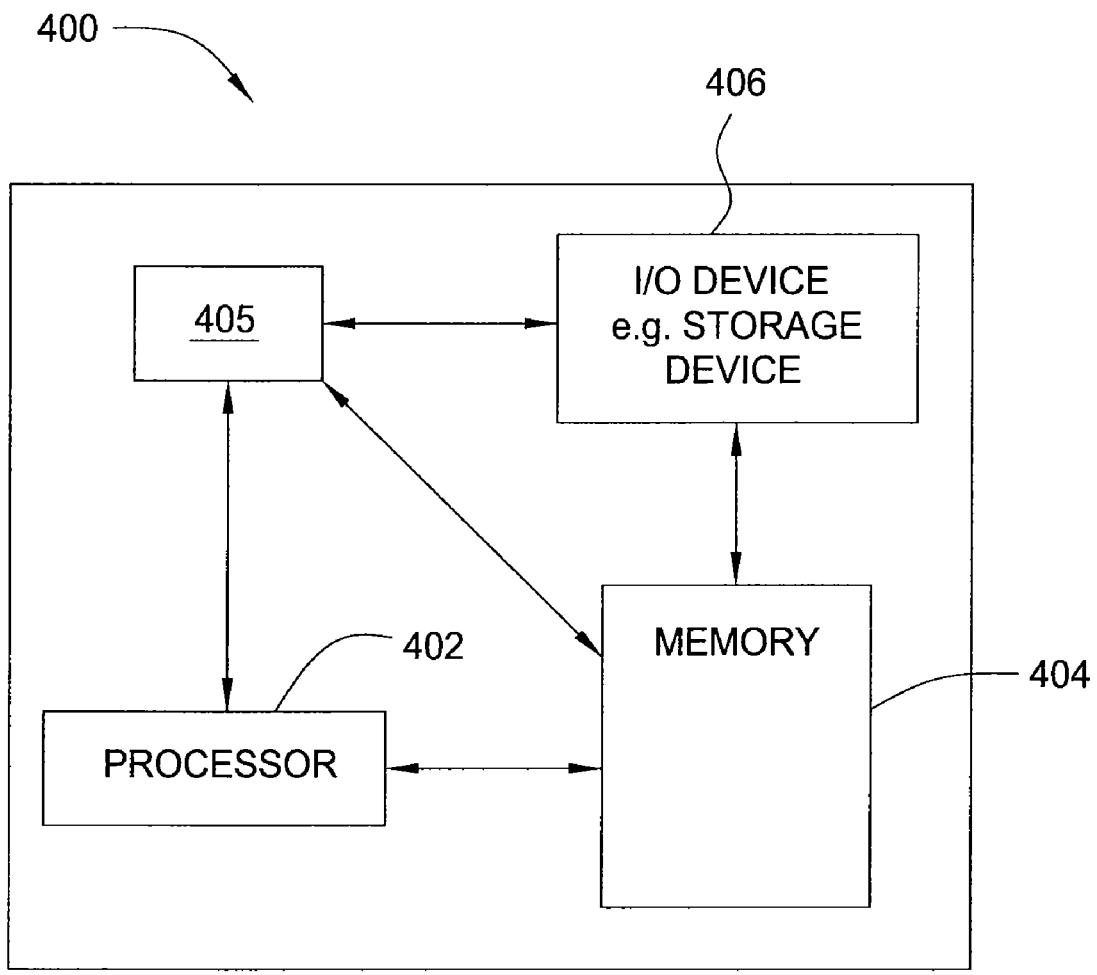
FIG. 4 is a high level block diagram of the reward-based learning method that is implemented using a general purpose computing device.

FIG. 4 is a high level block diagram of the reward-based learning method that is implemented using a general purpose computing device 400. In one embodiment, a general purpose computing device 400 includes a processor 402, a memory 404, a reward-based learning module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the reward-based learning module 405 can be implemented as a physical device or subsystem that is coupled to a processor through a communication channel.

Alternatively, the reward-based learning module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the reward-based learning module 405 for reward-based learning described herein with reference to the preceding Figures can be stored on a computer readable medium or carrier (e.g., RAM, magnetic or optical drive or diskette, and the like).

Thus, the present invention represents a significant advancement in the field of automatic learning of policies for managing a system or controlling a plant. Embodiments of the invention take a "raw" data set suitable for reward-based learning, and apply dimensionality reduction techniques in order to obtain a transformed, lower-dimension training set. One can then apply any one or more of a number of known reward-based learning methods to the lower-dimension training set in order to obtain a behavioral policy.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While foregoing is directed to the preferred embodiment of the present invention, other and further embodiments of the invention may be devised without departing from the basic scope thereof, and the scope thereof is determined by the claims that follow.

The invention claimed is:

1. A method for learning a management policy, comprising:
   receiving a set of one or more exemplars, wherein at least two of the one or more exemplars comprise a (state, action) pair for a system, and at least one of the one or more exemplars comprises a reward responsive to performing an action in a state;
   obtaining a set of one or more pairwise distances between one or more pairs of the one or more exemplars;
   applying a nonlinear dimensionality reduction to the one or more exemplars and to the one or more pairwise distances in order to embed the one or more exemplars into a lower dimensional space, thereby producing embedded exemplars, wherein one or more parameters of the nonlinear dimensionality reduction are tuned to minimize a cross-validation Bellman error on a holdout set taken from the set of one or more exemplars; and
   applying a reward-based learning method to the embedded exemplars in order to derive a learned management policy,
   wherein at least one of: the receiving, the obtaining, the applying the nonlinear dimensionality reduction, or the applying the reward-based learning method is performed using a processor.

2. The method of claim 1, wherein the obtaining comprises:
   applying a distance metric to the one or more pairs of the one or more exemplars.

3. The method of claim 1, further comprising:
   applying the learned management policy to manage a computing system or to control a plant.

4. The method of claim 1, wherein the nonlinear dimensionality reduction is at least one of: Laplacian Eigenmaps, Maximum Variance Unfolding, Isomap, Spatio-temporal Isomap, Local Linear Embedding, Stochastic Proximity Embedding or Random Projections.

5. The method of claim 1, further comprising:
   constructing a general out-of-sample embedding function in accordance with the embedded exemplars.

6. The method of claim 5, wherein the out-of-sample embedding function is constructed using Local Linear Embedding.

7. The method of claim 2, wherein the one or more pairwise distances are computed in accordance with a pre-specified distance metric.

8. The method of claim 1, wherein the reward-based learning method is a Reinforcement Learning method.

9. The method of claim 8, wherein the Reinforcement Learning method is one of: a value-function learning method, an actor-critic method or a direct policy method.

10. The method of claim 8, wherein the Reinforcement Learning method is one of: Temporal Difference Learning, Q-Learning, Sarsa or a policy gradient method.

11. The method of claim 2, wherein the one or more pairwise distances are computed in accordance with a learned distance metric.

12. The method of claim 1, wherein the nonlinear dimensionality reduction is applied separately to a state associated with each of the one or more exemplars and to an action associated with the each of the one or more exemplars.

13. The method of claim 1, wherein the nonlinear dimensionality reduction is applied to only one of: a state associated with each of the one or more exemplars or an action associated with the each of the one or more exemplars.

14. A computer readable medium containing an executable program for reward-based learning of a management policy, where the program performs steps of:
   receiving a set of one or more exemplars, wherein at least two of the one or more exemplars comprise a (state, action) pair for a system, and at least one of the one or more exemplars comprises a reward responsive to performing an action in a state;
   obtaining a set of one or more pairwise distances between one or more pairs of the one or more exemplars;
   applying a nonlinear dimensionality reduction to the one or more exemplars and to the one or more pairwise distances in order to embed the one or more exemplars into a lower dimensional space, thereby producing embedded exemplars, wherein one or more parameters of the nonlinear dimensionality reduction are tuned to minimize a cross-validation Bellman error on a holdout set taken from the set of one or more exemplars; and
   applying a reward-based learning method to the embedded exemplars in order to derive a learned management policy.

15. The computer readable medium of claim 14, wherein the obtaining comprises:
   applying a distance metric to the one or more pairs of the one or more exemplars.

16. The computer readable medium of claim 14, further comprising:
   applying the learned management policy to manage a computing system or to control a plant.

17. The computer readable medium of claim 14, wherein the nonlinear dimensionality reduction is at least one of: Laplacian Eigenmaps, Maximum Variance Unfolding, Isomap, Spatio-temporal Isomap, Local Linear Embedding, Stochastic Proximity Embedding or Random Projections.

18. The computer readable medium of claim 14, further comprising:
   constructing a general out-of-sample embedding function in accordance with the embedded exemplars.

19. The computer readable medium of claim 18, wherein the out-of-sample embedding function is constructed using Local Linear Embedding.

20. The computer readable medium of claim 15, wherein the one or more pairwise distances are computed in accordance with a pre-specified distance metric.

21. The computer readable medium of claim 14, wherein the reward-based learning method is a Reinforcement Learning method.

22. The computer readable medium of claim 15, wherein the one or more pairwise distances are computed in accordance with a learned distance metric.

23. A system for learning a management policy, comprising:
   means for receiving a set of one or more exemplars, wherein at least two of the one or more exemplars comprise a (state, action) pair for a system, and at least one of the one or more exemplars comprises a reward responsive to performing an action in a state;
   means for obtaining a set of one or more pairwise distances between one or more pairs of the one or more exemplars;
   means for applying a nonlinear dimensionality reduction to the one or more exemplars and to the one or more pairwise distances in order to embed the one or more exemplars into a lower dimensional space, thereby producing embedded exemplars, wherein one or more parameters of the nonlinear dimensionality reduction are tuned to minimize a cross-validation Bellman error on a holdout set taken from the set of one or more exemplars; and
   means for applying a reward-based learning method to the embedded exemplars in order to derive a learned management policy.

24. The system of claim 23, wherein the means for obtaining comprises:
   means for applying a distance metric to the one or more pairs of the one or more exemplars.

* * * * *